US011338759B2

(12) United States Patent
Nakajima et al.

(10) Patent No.: US 11,338,759 B2
(45) Date of Patent: May 24, 2022

(54) AIRBAG DEVICE

(71) Applicant: Autoliv Development AB, Vargarda (SE)

(72) Inventors: Yutaka Nakajima, Kanagawa (JP); Atsushi Nakashima, Kanagawa (JP); Takayuki Shimizu, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 39 days.

(21) Appl. No.: 16/987,517

(22) Filed: Aug. 7, 2020

(65) Prior Publication Data

US 2021/0039581 A1 Feb. 11, 2021

(30) Foreign Application Priority Data

Aug. 9, 2019 (JP) .............................. JP2019-147360
Oct. 4, 2019 (JP) .............................. JP2019-183752
Jun. 15, 2020 (JP) .............................. JP2020-102783

(51) Int. Cl.
*B60R 21/233* (2006.01)
*B60R 21/207* (2006.01)
(Continued)

(52) U.S. Cl.
CPC .......... *B60R 21/233* (2013.01); *B60R 21/207* (2013.01); *B60R 21/217* (2013.01);
(Continued)

(58) Field of Classification Search
CPC ................ B60R 21/233; B60R 21/207; B60R 21/23138; B60R 2021/23146;
(Continued)

(56) References Cited

U.S. PATENT DOCUMENTS 9,238,425 B2 * 1/2016 Fukawatase .......... B60R 21/013
9,573,553 B2 * 2/2017 Ko ........................ B60R 21/207
(Continued)

FOREIGN PATENT DOCUMENTS

CN 112339698 A * 2/2021 ............ B60R 21/231
DE 19751898 A1 * 6/1998 ....... B60R 21/23138
(Continued)

OTHER PUBLICATIONS

Dae et al. KR 10-2096933 English Machine Translation, ip.com. (Year: 2018).*
(Continued)

*Primary Examiner* — Karen Beck
(74) *Attorney, Agent, or Firm* — Harness, Dickey & Pierce, P.L.C.; Stephen T. Olson

(57) ABSTRACT

[Problem] To expand and deploy a hood-shaped airbag in a reliably sandwiched condition between the top of a shoulder of a seated occupant and a seatbelt in a normal set condition during a collision, and reduce injury to the occupant by a device other than an airbag such as a seatbelt or the like.

[Resolution Means] An airbag device 11 contains an airbag 12 and inflator 13 integrally covering the head 2a and a side portion of a seated occupant 2. The airbag 12 in a flat condition prior to folding has a plurality of chambers 12c demarcated in a longitudinal direction. The chamber 12c has a head protecting chamber 12ca stored in an upper portion of a backrest portion 1b of a seat 1 and a pair of side protecting chambers 12cb stored in opposing positions separated in a vehicle width direction on both left and right sides of the backrest portion 1b. At the time of expansion and deployment, the side protecting chamber 12cb expands and deploys between the seatbelt 3 and occupant 2, and thus the
(Continued)

airbag 12 is configured such that a space S is formed between the occupant 2 and airbag 12 deployed at a position where the seatbelt 3 passes.

19 Claims, 10 Drawing Sheets

(51) Int. Cl.
    *B60R 21/231*    (2011.01)
    *B60R 21/217*    (2011.01)
    *B60R 21/237*    (2006.01)
    *B60R 21/26*    (2011.01)
    *B60R 21/00*    (2006.01)

(52) U.S. Cl.
    CPC ...... *B60R 21/237* (2013.01); *B60R 21/23138* (2013.01); *B60R 21/26* (2013.01); *B60R 2021/0044* (2013.01); *B60R 2021/0048* (2013.01); *B60R 2021/0055* (2013.01); *B60R 2021/0058* (2013.01); *B60R 2021/23146* (2013.01); *B60R 2021/23316* (2013.01)

(58) Field of Classification Search
    CPC .......... B60R 21/231; B60R 2021/0006; B60R 2021/0009
    See application file for complete search history.

(56) References Cited

U.S. PATENT DOCUMENTS

2021/0001799 A1* 1/2021 Sandinge .............. B60R 21/233
2021/0009074 A1* 1/2021 Wold .................... B60R 21/231

FOREIGN PATENT DOCUMENTS

| | | | | | |
|---|---|---|---|---|---|
| DE | 102004031865 | A1 | * | 2/2006 | ....... B60R 21/23138 |
| DE | 102020124803 | A1 | * | 4/2021 | ........... B60R 21/207 |
| DE | 102020101051 | A1 | * | 7/2021 | ......... B60R 21/2338 |
| EP | 1772326 | A1 | * | 4/2007 | ........... B60R 21/207 |
| EP | 3536563 | A1 | * | 9/2019 | ........... B60R 21/233 |
| EP | 3581441 | A1 | * | 12/2019 | ........... B60R 21/207 |
| EP | 3772438 | A1 | * | 2/2021 | ........... B60R 21/237 |
| JP | 2018-83554 | A | | 5/2018 | |
| JP | 2021054098 | A | * | 4/2021 | |
| JP | 2021059320 | A | * | 4/2021 | |
| KR | 20140079436 | A | * | 6/2014 | ........... B60N 2/4235 |
| KR | 101720754 | B1 | * | 3/2017 | ........... B60R 21/207 |
| KR | 102096933 | B1 | | 4/2020 | |
| KR | 102167448 | B1 | | 10/2020 | |
| WO | WO-2007099668 | A1 | * | 9/2007 | ........... B60R 21/207 |
| WO | WO-2011065385 | A1 | * | 6/2011 | ....... B60R 21/23138 |
| WO | WO-2017068941 | A1 | * | 4/2017 | ................ B60N 2/75 |
| WO | WO-2020141737 | A1 | * | 7/2020 | ........... B60R 21/235 |
| WO | WO-2021029197 | A1 | * | 2/2021 | ........... B60R 21/233 |
| WO | WO-2021033433 | A1 | * | 2/2021 | ........... B60R 21/233 |
| WO | WO-2021059766 | A1 | * | 4/2021 | ........... B60R 21/207 |
| WO | WO-2021149576 | A1 | * | 7/2021 | ........... B60R 21/231 |
| WO | WO-2021161748 | A1 | * | 8/2021 | |

OTHER PUBLICATIONS

Kim et al. KR 10-2167448 English Machine translation, ip.com. (Year: 2019).*
T. Ujiie, (JP) WO 2011/065385 A1 English Machine Translation, ip.com. (Year: 2011).*

* cited by examiner

[FIG. 1A]
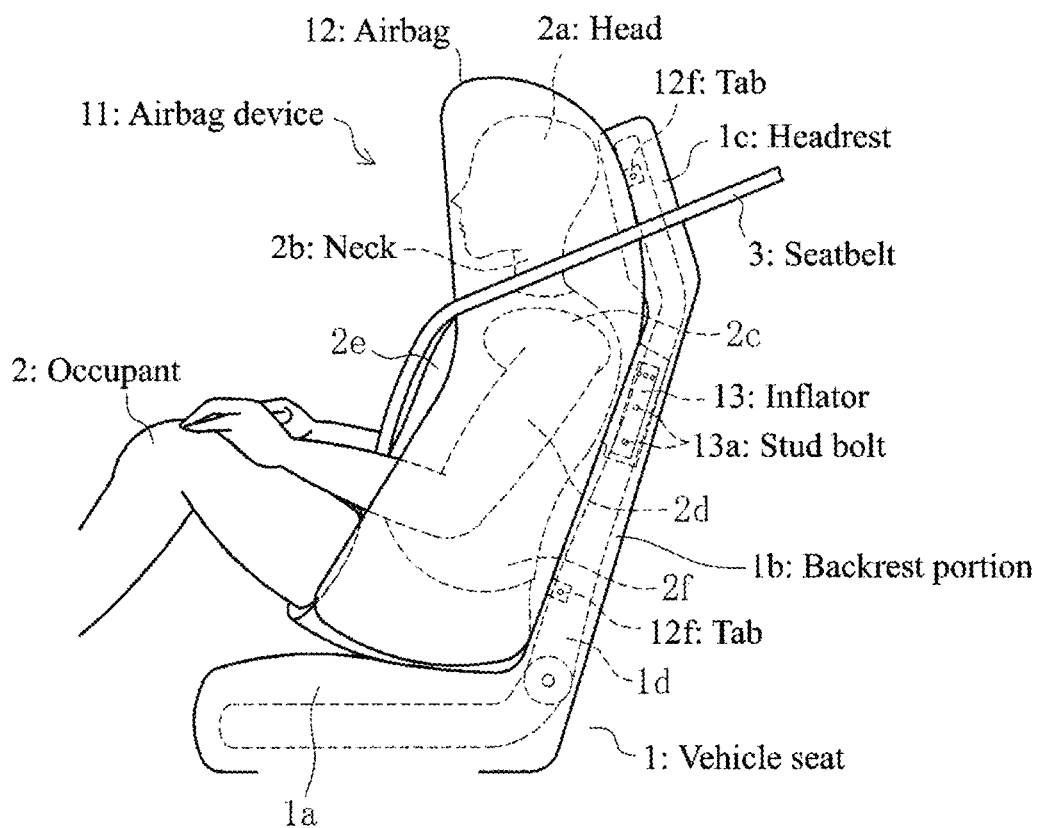
[FIG. 1B]
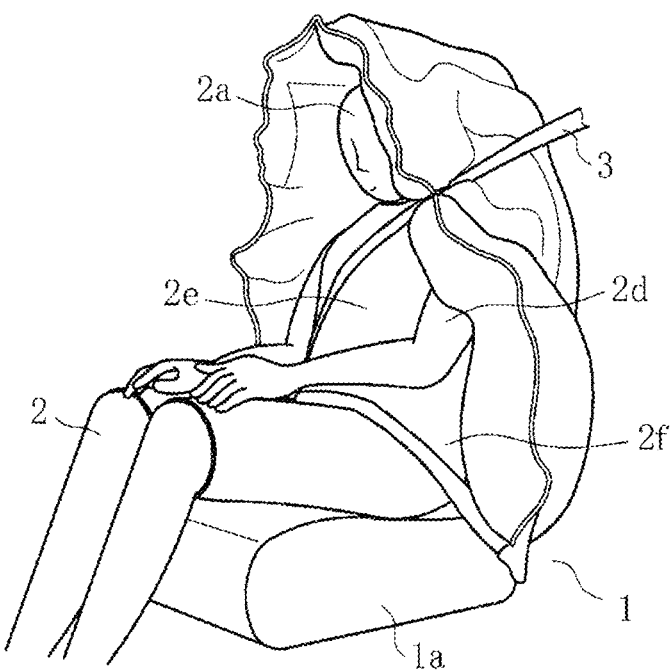

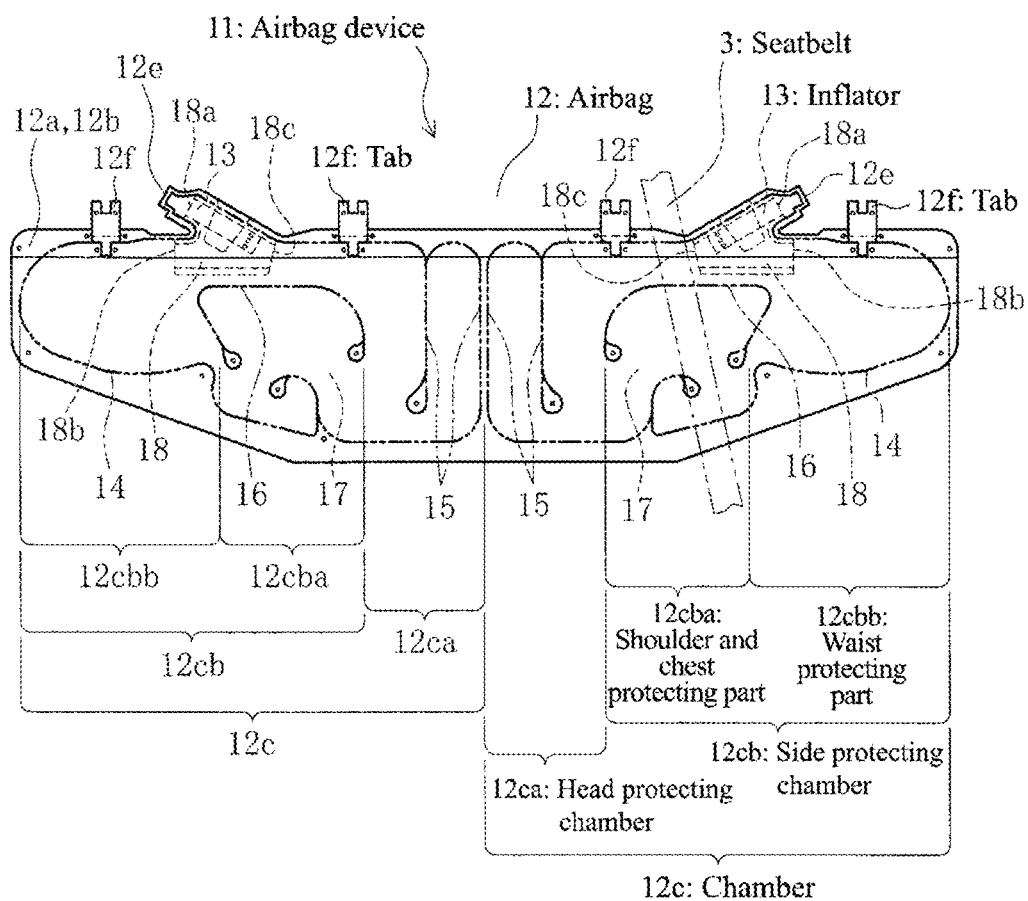
[FIG. 2]

[FIG. 3A]
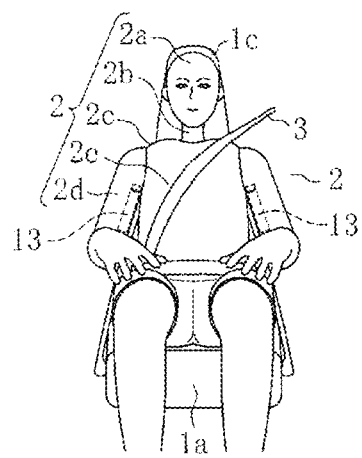
[FIG. 3B]
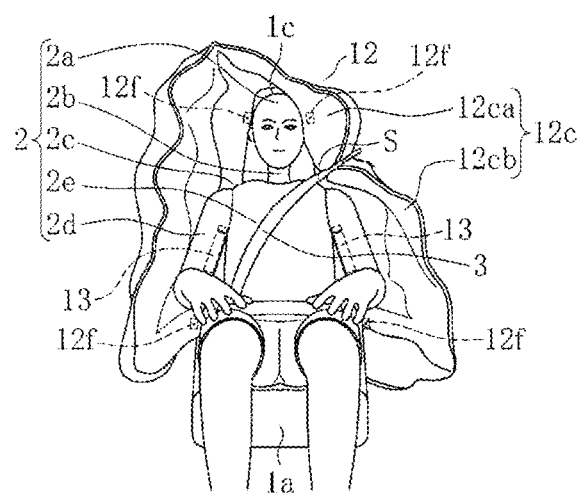
[FIG. 3C]
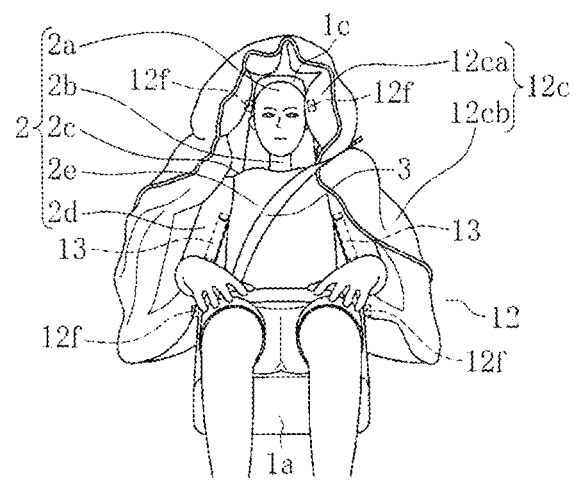

[FIG. 4]
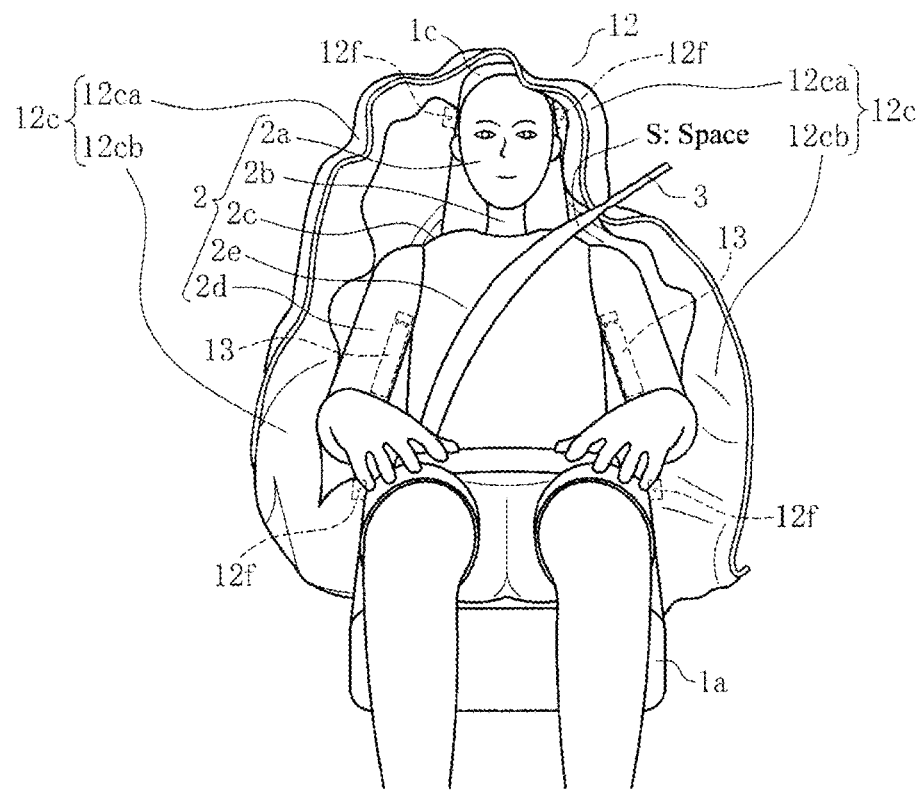
[FIG. 5]
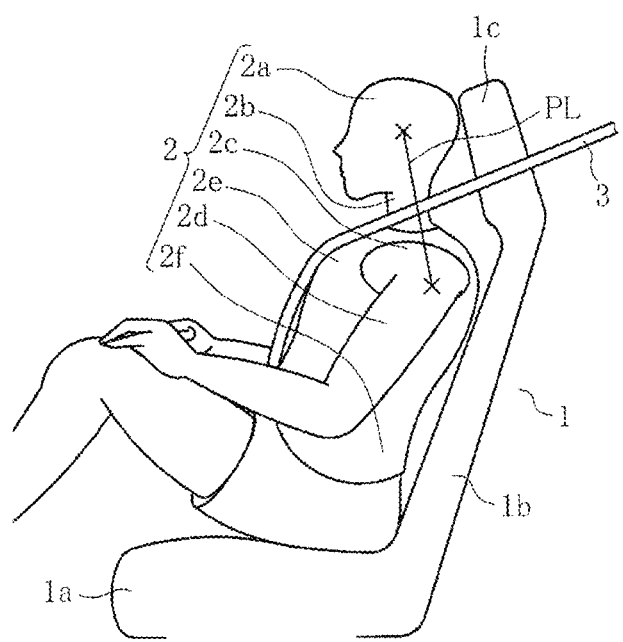

[FIG. 6A]
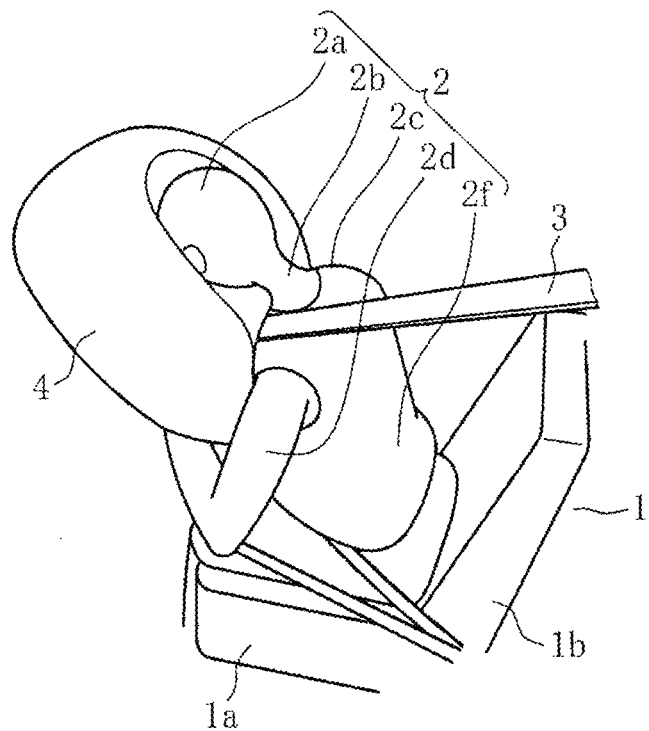
[FIG. 6B]
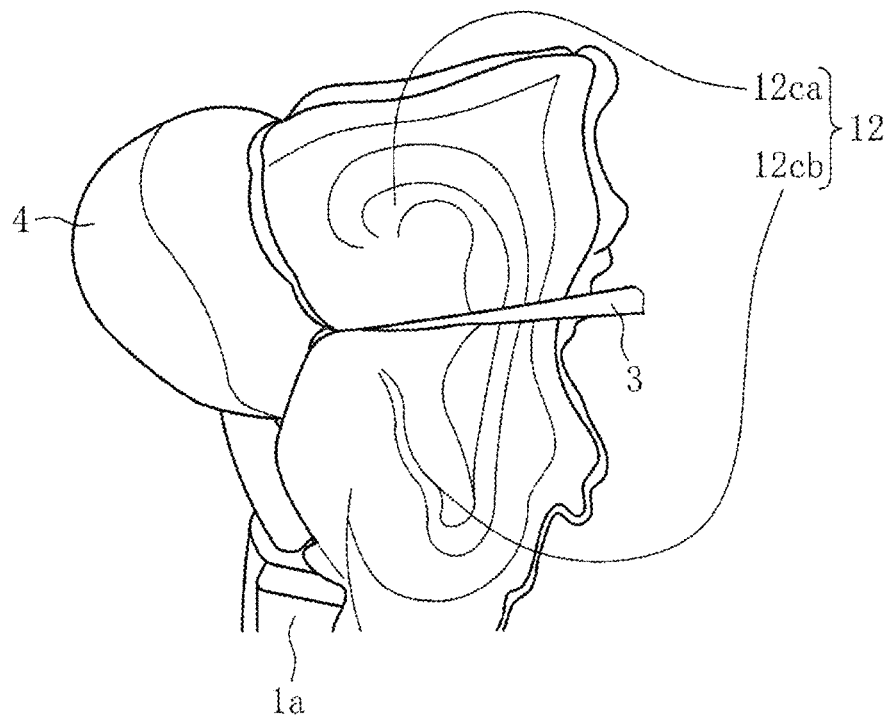

[FIG. 7A]
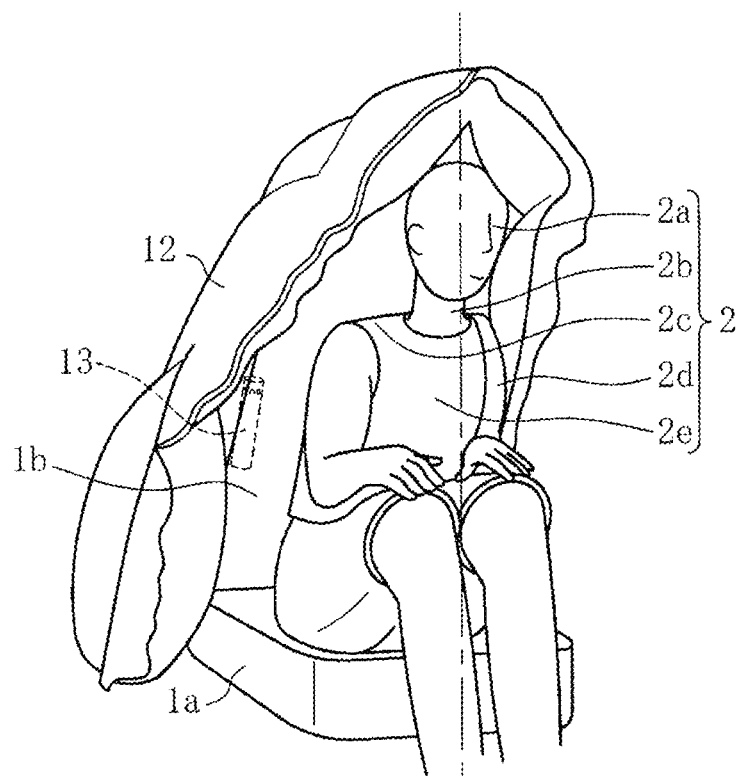
[FIG. 7B]
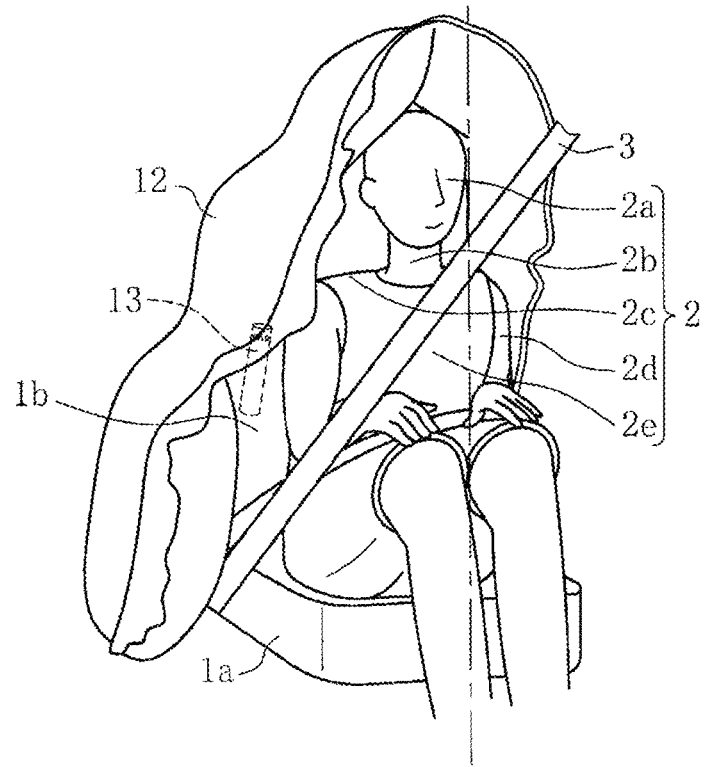

[FIG. 8A]
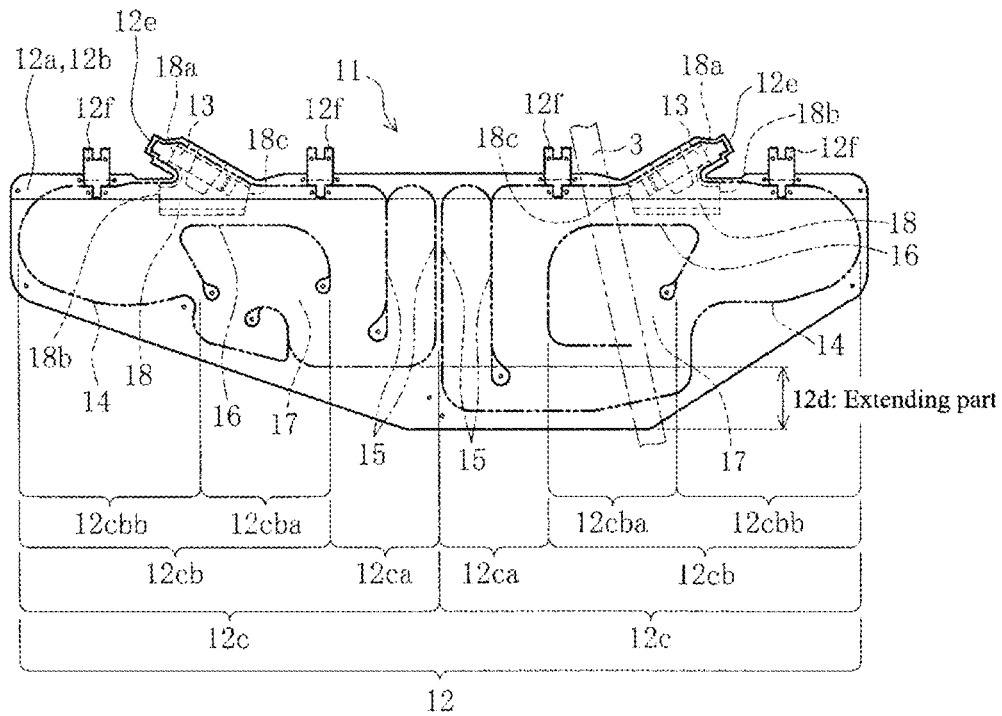
[FIG. 8B]
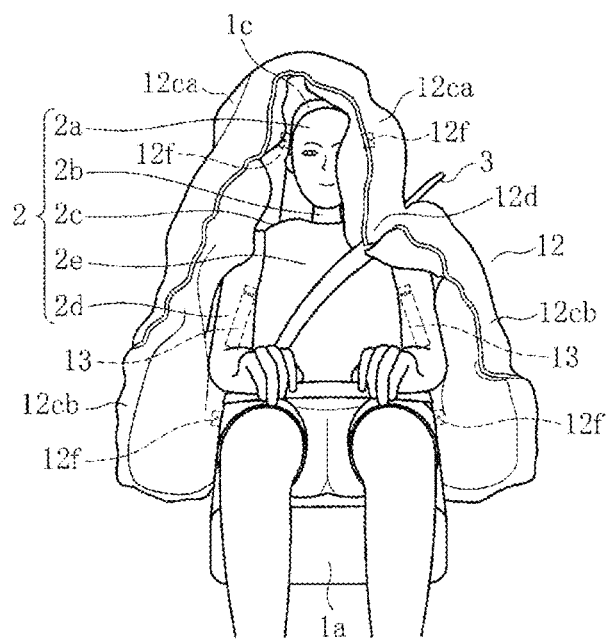

[FIG. 9A]
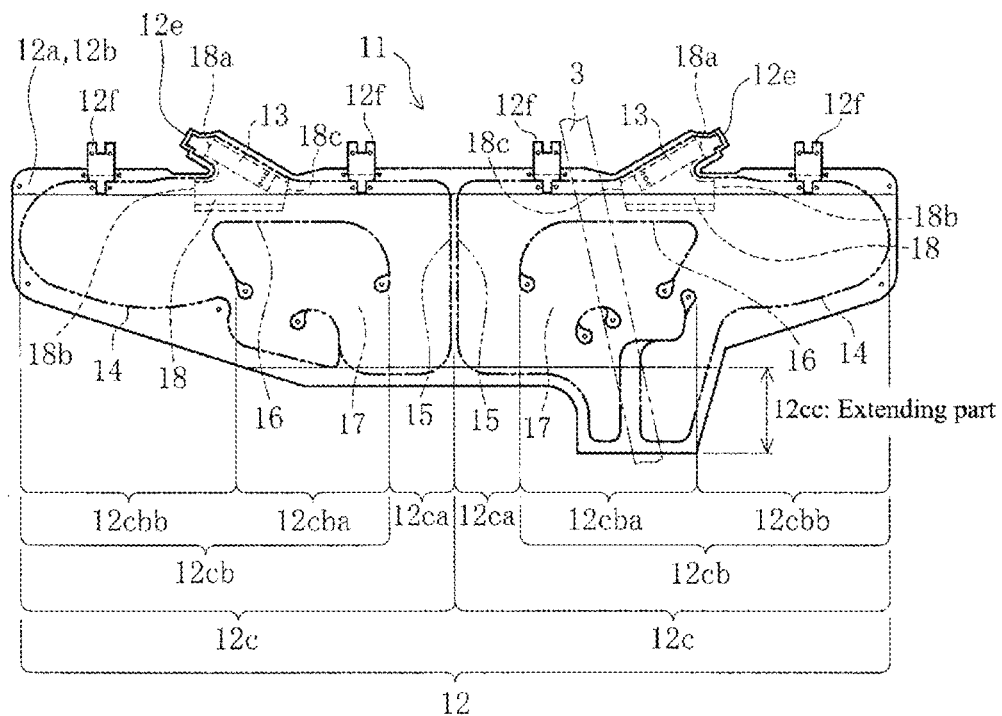
[FIG. 9B]
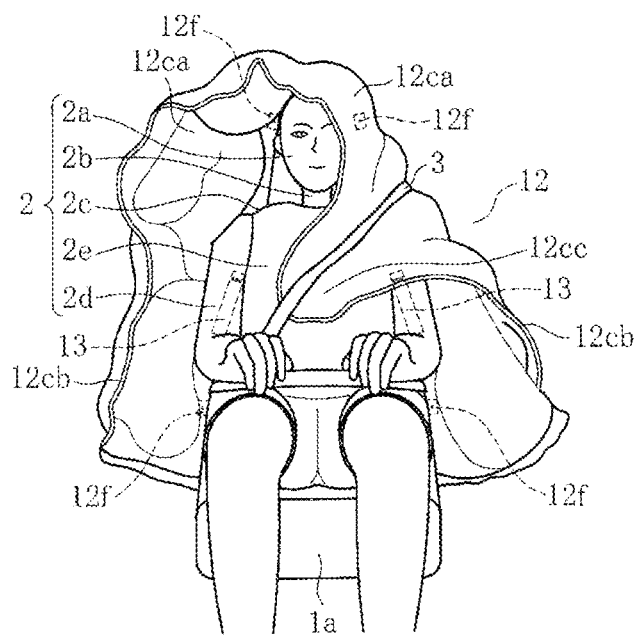

[FIG. 10A]
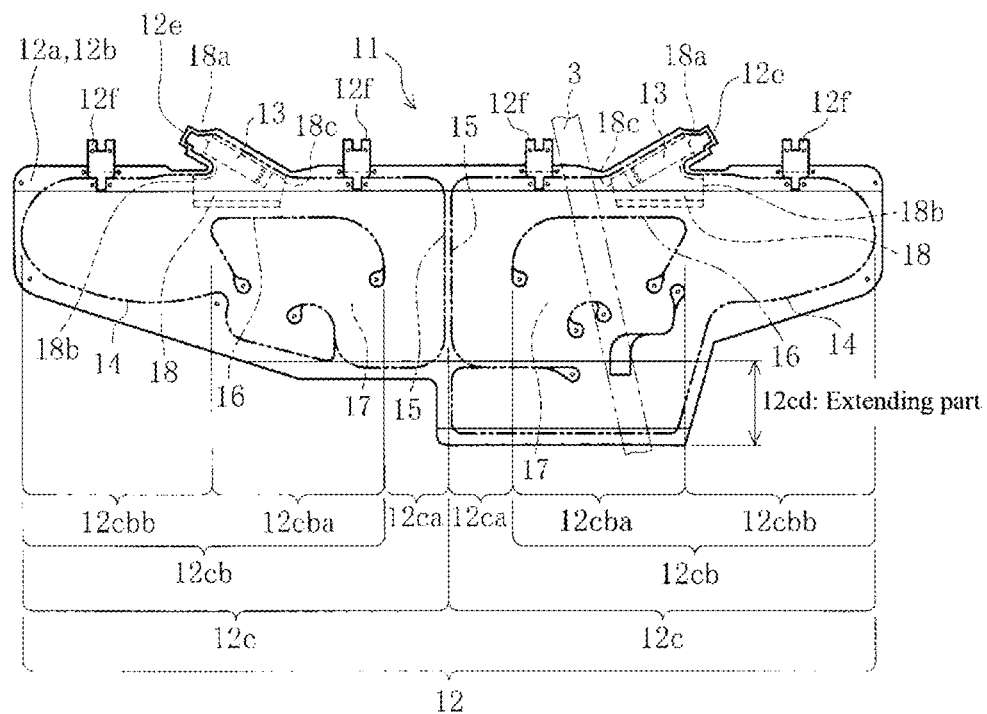
[FIG. 10B]
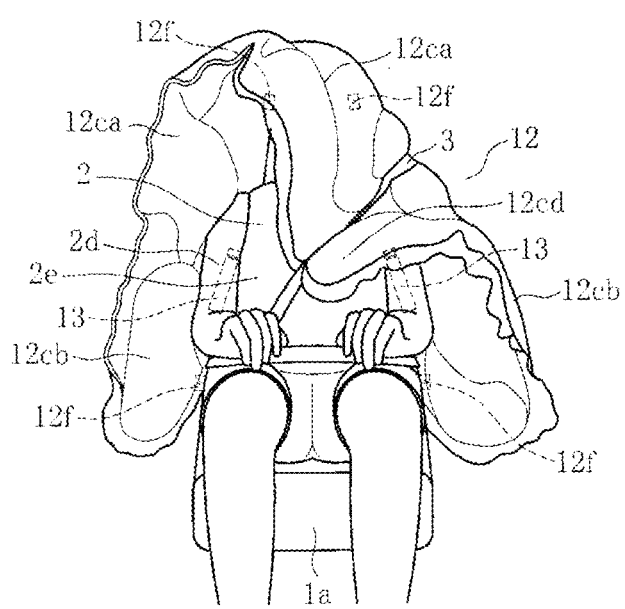

[FIG. 11A]
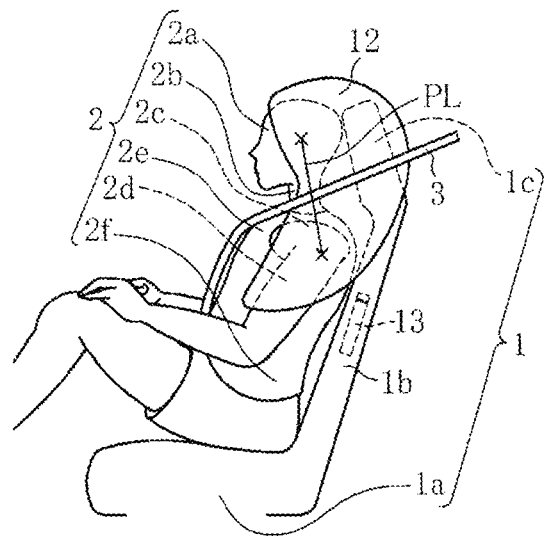
[FIG. 11B]
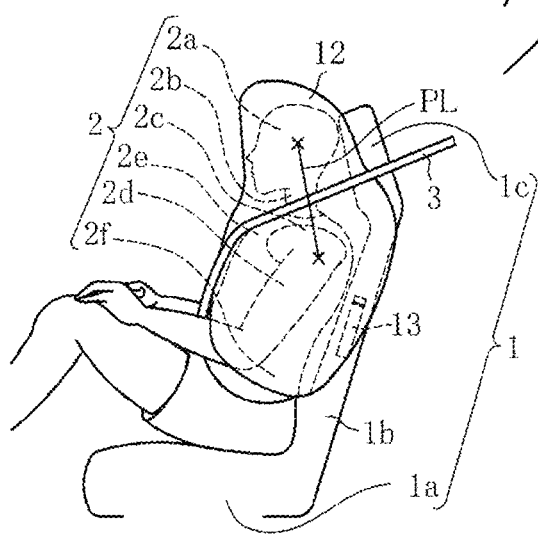
[FIG. 11C]
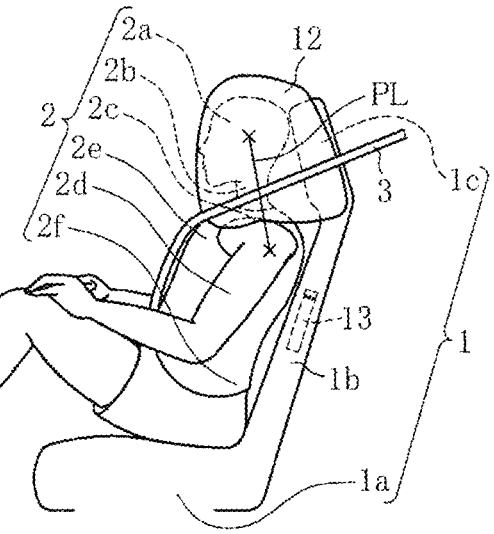
[FIG. 11D]
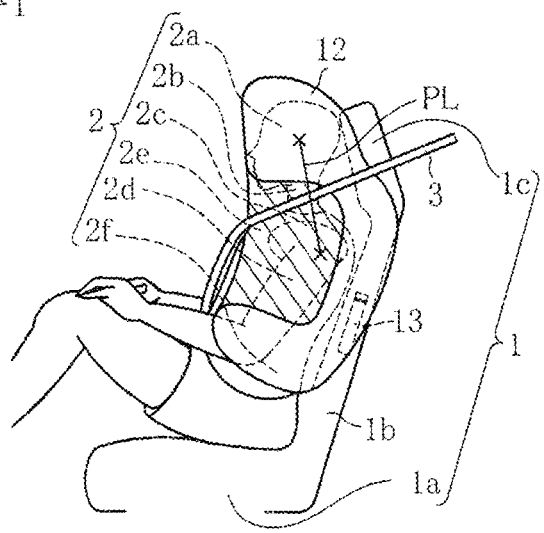

AIRBAG DEVICE

CROSS-REFERENCE TO RELATED APPLICATIONS

This application claims the benefit of Japanese Patent Application No. 2019-147360 filed Aug. 9, 2019, Japanese Patent Application No. 2019-183752 filed Oct. 4, 2019, and Japanese Patent Application No. 2020-102783 filed Jun. 15, 2020, the disclosures of which are herein incorporated by reference in their entirety.

TECHNICAL FIELD

The present invention relates to an airbag device that protects the head of an occupant seated on a vehicle seat, side portion and front portion of the shoulder, upper arm, and chest of the occupant, and in some cases, the abdomen and side portion of the abdomen of the occupant, during a vehicle collision, for example.

Hereinafter, in the present application, "up (upper)" and "above" refer to the head direction of the occupant seated in a regular condition, while "down (lower)" and "below" similarly refer to the foot direction. Moreover, "front" and "forward" refer to the front direction of the occupant seated in the regular condition, while "rear" and "rearward" similarly refer to the back direction. Moreover, "left" and "left side" refer to the left-hand direction of the occupant seated in the regular condition, while "right" and "right side" similarly refer to the right-hand direction. Furthermore, for example, in a flat condition prior to folding an airbag where a base material is stitched into a bag, the left-right direction refers to the direction where a head protecting chamber and side protecting chamber are aligned, and the vertical direction refers to the direction orthogonal to the left-right direction on the same plane. Furthermore, the edge portion side where a tab for attaching to the seat is provided refers to the "upward" direction, and an opposite side refers to the "downward" direction.

BACKGROUND

In recent years, for example, a hood-shaped (shell-shaped) airbag that bursts out from a seat has been proposed, which covers and protects the head of an occupant seated on the seat, as well as the side portions of the shoulder, upper arm, and chest of the occupant during a vehicle collision (For example, Patent Document 1).

For example, with the airbag device, when the hood-shaped airbag is expanded and deployed in a condition where the occupant seated in the seat applies a seatbelt attached to a vehicle body as usual, the airbag is preferably in a condition sandwiched between the seatbelt and top of a shoulder.

The reason is because when the relative positions of the airbag, seatbelt, and occupant are in the positional relationship described above, the amount of chest deflection of the occupant by the seatbelt during a frontal collision is reduced. As a result, occupant restraining performance is achieved, and injury to the occupant (chest deflection amount) can be reduced. Note that "chest deflection amount" refers to a relative position between the thoracic ribs and the spine, and is a value used as an index for evaluating chest injury in an offset frontal collision.

Furthermore, in the event of an oblique collision or the like, the seatbelt can act as a reactive force on the entire airbag. Thus, even if the occupant moves in a forward direction diagonally to the left or right, the seatbelt functions restrictively, and the restraining force of the entire hood-shape airbag can be increased.

For example, for a far-side collision during an oblique collision, the seatbelt is ideally set over the top of the far side shoulder of the occupant. However, even with a seatbelt set over the top of the shoulder on the near side of the occupant, the near side of the airbag is restrained against the headrest and an upper end portion of the seat by the seatbelt. Therefore, the far side of the airbag can be prevented from greatly deforming. Thereby, even during a far-side collision, the occupant can be effectively protected by the seatbelt passing over the top of the shoulder on the near side of the occupant. When looking at one of the seats installed side by side in a width direction of a vehicle, "far side" refers to a side farther from a side door near the occupant seated on the seat, and "near side" refers to the side door side near the occupant.

However, for example, in the event of a collision, an airbag device has yet to be proposed where a hood-shaped airbag expands and deploys in a reliably sandwiched condition between the top of a shoulder of an occupant seated on the seat and the seat belt in a normally set condition.

RELATED ART DOCUMENTS

Patent Documents

[Patent Document 1] Japanese Unexamined Patent Application Publication No. 2018-83554

SUMMARY OF THE INVENTION

Problem to be Solved by the Invention

The following two points are problems to be solved by the present invention.

In the event of a collision (and particularly a side collision or oblique collision), injury directly applied from the head to the waist of an occupant seated in the seat due to a side collision or the like is required to be reduced simultaneously while reducing the amount of chest deflection applied by the seatbelt worn by the occupant.

In the event of a collision with a hood-shaped airbag that integrally covers from the head to a side portion of the waist of the occupant seated in the seat, the airbag is required to expand and deploy in a reliably sandwiched condition between the top of the shoulder of the occupant and the seatbelt in the normally set condition.

Means for Solving the Problem

In view of the foregoing, an object of the present invention is to provide a hood-shaped airbag that expands and deploys in a reliably sandwiched condition, between the top of the shoulder of the occupant seated in the seat and the seatbelt in a normally set condition during a collision. Furthermore, by achieving the object, injury to the occupant by the seatbelt or the like other than the airbag can be reduced (for example, reduction in the amount of chest deflection).

In other words, the present invention is an airbag device containing an airbag that integrally covers the head and side portion of an occupant seated on a vehicle seat, and an inflator that supplies gas to the airbag, and has the following configuration as main characteristics.

For example, the airbag in the flat condition prior to being rolled into a roll shape or folded into a bellow shape has a plurality of chambers demarcated in the longitudinal direction. The chambers have a head protecting chamber that covers from the crown of the head of the occupant to the side of the head and a side protecting chamber that covers the side portion of the occupant. The head protecting chambers are disposed on center portion sides in the left-right direction of the airbag in the flat condition, and the side protecting chambers are disposed on both sides in the left-right direction of the airbag in the flat condition. Furthermore, the airbag has a plurality of tabs attached to an upper edge in the flat condition.

Furthermore, the airbag is stored, for example, in a condition rolled into a roll shape or a condition folded into a bellows shape from a first side portion of the backrest portion of the seat through an upper portion to a second side portion. Specifically, the pair of side protecting chambers are stored at opposing positions separated in the vehicle width direction on both left and right side portions of the backrest portion of the seat, and the head protecting chamber is stored in an upper portion of the backrest portion. Note that the upper portion of the backrest portion of the seat refers to an upper portion of the headrest when integrally formed with a headrest.

Thereby, during deployment, the head protecting chamber expands and deploys bursting past the headrest from the upper portion of the backrest portion of the seat, or forward from the upper portion of the backrest portion. On the other hand, the side protecting chambers expand and deploy forward from both left and right sides of the backrest portion of the seat.

At this time, the side protecting chamber can expand and deploy between the occupant and seatbelt in a normal set condition, and thus the airbag is configured such that a space can be formed between the occupant and airbag, expanding and deploying at a position where the seatbelt passes. Specifically, with the seatbelt passing over a near side shoulder of the occupant, the side protecting chamber expands and deploys between a side of the head on the side door side of the occupant seated at a regular position (or upper end portion on the side door side of the headrest) and an upper end portion on the side door side of the shoulder (or upper end portion on the side door side of the backrest portion), and thus the airbag is configured such that a space can be formed.

The airbag device of the present invention with the configuration described above forms a space between the neck of the occupant seated in the seat and the airbag expanding and deploying at a position where the seatbelt passes. Therefore, even if the expanded and deployed airbag is held down by the seatbelt in a worn state, relative movement of the airbag with regard to the occupant can be facilitated, and the shoulder of the occupant can be covered by the expanded and deployed airbag. Furthermore, even when the seatbelt is tensioned, the expanded and deployed airbag is in a condition sandwiched between the shoulder of the occupant and the seatbelt, and thus the seatbelt can be suppressed from contacting the neck of the occupant, thereby reducing injury to the neck of the occupant by the seatbelt. At the same time, while the expanded and deployed airbag causes the seatbelt to be in a floating condition at least in the vicinity of an upper portion of the chest of the occupant, a lower portion of the seatbelt can appropriately restrain a lower portion of the occupant at the abdomen, and thus the amount of chest deflection is reduced. In other words, unnecessary forces applied on the occupant seated in the seat can be minimized as a whole.

In the present invention, in order to form the space, the airbag is preferably formed such that the position where the seatbelt passes is positioned near an outlet of gas ejected from the inflator into the side protecting chamber during expansion and deployment of the airbag. In order to achieve the positional relationship, for example, the tabs are preferably attached to upper edge portions of the airbag on both left and right sides of the inflators inserted into the upper edge portions of the airbag in a flat condition prior to being rolled into a roll shape or folded into a bellows shape, and are preferably attached to the seat by stud bolts provided in the tabs and inflators. Thereby, high gas pressure is applied to a region of the airbag sandwiched between the shoulder of the occupant and the seatbelt. Thus, the airbag is expanded and deployed while pushing up the seatbelt.

Furthermore, in the present invention, in order to form the space, the side protecting chamber preferably has a shoulder and chest protecting part that protects the shoulder and chest of the occupant, and a waist protecting part that covers the waist of the occupant. Moreover, the shoulder and chest protecting part is preferably formed at a position where the seatbelt passes during expansion and deployment.

The shoulder and chest protecting part is preferably configured such that a portion of the shoulder and chest protecting part where the seatbelt passes extends more to a front of a vehicle than another portion of the side protecting chamber (for example, downward in the flat condition prior to being rolled into a roll shape or folded into a bellows shape), so as to contact the seatbelt and wrap around in front of the occupant during expansion and deployment. With this configuration, a range where the airbag wraps around in front of the occupant increases, and thus the occupant restraining performance improves.

Furthermore, if the head protecting chamber also extends to the front of the vehicle (for example, downward in the flat condition prior to being rolled into a roll shape or folded into a bellows shape) in addition to the shoulder and chest protecting part, the front of the head of the occupant can be covered by the airbag. Therefore, the occupant restraining range is further increased. In this case, even if a front airbag is not present, the amount of chest movement of the occupant will be approximately the same as when restraining an occupant using a front airbag and seatbelt.

Effects of the Invention

With the present invention, a space is formed between the neck of an occupant seated in a seat and an airbag that expands and deploys at a position where a seatbelt passes. Therefore, the chest deflection amount is reduced while at the same time injury by the seatbelt to the neck of the occupant is also reduced. In other words, unnecessary forces applied on the occupant seated in the seat can be minimized as a whole.

BRIEF DESCRIPTION OF THE DRAWINGS

FIGS. 1(A) and 1(B) are views for describing an airbag device of the present invention, where FIG. 1(A) is a side surface view illustrating an example of a range where an occupant seated on a seat is covered by an airbag, and FIG. 1(B) is a front-left view of a condition after the airbag is expanded and deployed.

FIG. 2 is a view illustrating a first example of an airbag of the airbag device of the present invention, for example, in a flat condition prior to being rolled into a roll shape or folded into a bellows shape.

FIGS. 3(A) and 3(B) are front surface views of a seatbelt wearing condition of an occupant seated in a seat storing the airbag device of the present invention, where FIG. 3(A) illustrates a condition prior to the airbag expanding and deploying, FIG. 3(B) illustrates a condition 20 ms after the start of the airbag expanding and deploying, and FIG. 3(C) illustrates a condition after the airbag has expanded and deployed.

FIG. 4 is a front surface view for describing a space formed between the neck of an occupant seated in a seat and an airbag expanded and deployed at a position where a seatbelt passes, 15 ms after the start of expansion and deployment of the airbag of the airbag device of the present invention.

FIG. 5 is a side surface view for describing a position where a seatbelt that supports an occupant seated on a seat passes with the airbag of the airbag device of the present invention.

FIGS. 6(A) and 6(B) are views for describing an effect of the airbag of the present invention in a frontal collision, where FIG. 6(A) is a view illustrating a condition 80 ms after the start of airbag expansion and deployment when a front airbag and seatbelt are used, and FIG. 6(B) illustrates the condition when the airbag device of the present invention is used in combination with a front airbag and seatbelt.

FIGS. 7(A) and 7(B) are views for describing an effect of the airbag device of the present invention during a side collision, where FIG. 7(A) is a view illustrating a condition where an occupant moves in a lateral direction when the airbag device of the present invention is used without a seatbelt, and FIG. 7(B) illustrates the condition where the airbag device of the present invention is used in combination with a seatbelt.

FIG. 8(A) is a view similar to FIG. 2, illustrating a second example of an airbag of the airbag device of the present invention, for example, in a flat condition prior to being rolled into a roll shape or folded into a bellows shape, and FIG. 8(B) is a front surface view of a condition where the airbag illustrated in FIG. 8(A) is expanded and deployed.

FIG. 9(A) is a view similar to FIG. 2, illustrating a third example of an airbag of the airbag device of the present invention, for example, in a flat condition prior to being rolled into a roll shape or folded into a bellows shape, and FIG. 9(B) is a front surface view of a condition where the airbag illustrated in FIG. 9A is expanded and deployed.

FIG. 10(A) is a view similar to FIG. 2, illustrating a fourth example of an airbag of the airbag device of the present invention, for example, in a flat condition prior to being rolled into a roll shape or folded into a bellows shape, and FIG. 10(B) is a front surface view of a condition where the airbag illustrated in FIG. 10(A) is expanded and deployed.

FIG. 11(A) to (D) are views for describing a range where a side portion of an occupant is covered by an airbag of the airbag device of the present invention.

DESCRIPTION OF THE PREFERRED EMBODIMENT

An airbag device has yet to be proposed where, in the event of a collision, a hood-shaped airbag expands and deploys in a reliably sandwiched condition between the top of the shoulder of an occupant seated on a seat and a seat belt in a normally set condition.

The present invention configures the airbag such that a side protecting chamber expands and deploys between a seatbelt in a normal set condition and the top of the shoulder of the occupant seated in the seat during a collision, such that a space can be formed between the top of the shoulder of the occupant and the seatbelt. Furthermore, injury to an occupant by a safety device such as seatbelts and the like is reduced thereby (for example, the amount of chest deflection is reduced).

Examples

Examples of the present invention will be described hereinafter with reference to FIGS. 1 to 11.

As illustrated in FIG. 1, an airbag device 11 is provided with an airbag 12 that covers a side portion and front portion of a head 2a, neck 2b, shoulder 2c, upper arm 2d, chest 2e, and waist 2f of an occupant 2 seated in a vehicle seat 1. The airbag 12 is provided with an inflator 13 that ejects gas therein as illustrated in FIG. 2, which illustrates a flat condition of the airbag prior to being rolled into a roll shape or folded into a bellows shape.

The vehicle seat 1 is provided with a seat cushion 1a and a backrest portion 1b. A headrest 1c is integrally formed on an upper portion of the backrest portion 1b (refer to FIG. 1(a)) or is separately attached. The seat cushion 1a and backrest portion 1b are supported by a frame 1d.

The inflator 13 is formed in a cylindrical shape and is configured to eject gas from an outer side surface thereof. For example, as illustrated in FIG. 2, one inflator 13 is attached to each left and right side of an upper edge portion of the airbag 12 in a flat condition. For example, the outer circumference of the inflator 13 has two stud bolts 13a in an axial direction of the inflator 13, and is attached to the vehicle seat 1 by the stud bolts 13a (refer to FIG. 1(a)).

As illustrated in FIG. 2, for example, the airbag 12 in the flat condition has a shape where a left-right direction is longer than a vertical direction. Furthermore, two identical sheets 12a, 12b are overlaid and stitched at appropriate positions on an outer circumferential portion and inner portion to form expandable chambers 12c with the same shape on both left and right sides. 14 in FIG. 2 represents stitching on the outer circumferential portion.

Furthermore, the chamber 12c is demarcated by head protecting chambers 12ca positioned on center portion sides in the left-right direction of the airbag 12 in the flat condition and side protecting chambers 12cb positioned on both sides in the left-right direction of the airbag 12. In the present example, the head protecting chamber 12ca is formed by the stitching 14 of the outer circumferential portion, stitching 15 that continues to a center portion side in the left-right direction of the stitching 14, and stitching 16 independent from stitching 14. Furthermore, the side protecting chamber 12cb is formed by the stitching 14 of the outer circumferential portion and the independent stitching 16.

The head protecting chamber 12ca covers from the crown of the head to a side of the head of the occupant 2. Furthermore, the side protecting chamber 12cb covers a side portion of the occupant 2. FIG. 2 illustrates the side protecting chamber 12cb demarcated by the stitching 16 in a shoulder and chest protecting part 12cba adjacent to the head protecting chamber 12ca, and a waist protecting part 12cbb positioned on an opposite side of the shoulder and chest protecting part 12cba from the head protecting chamber 12ca.

Furthermore, in FIG. 2, a ventilating port 17 is formed between the head protecting chamber 12ca and side protecting chamber 12cb by not allowing an end portion of the stitching 16 on the stitching 15 side to connect with the stitching 14 of the outer circumferential portion. When expansion and deployment of the side protecting chamber 12cb is completed, the ventilating port 17 supplies gas to the head protecting chamber 12ca by gas flowing from the side protecting chamber 12cb to the head protecting chamber 12ca.

Furthermore, in FIG. 2, the airbag 12 has an insertion part 12e for each of the inflators 13 formed at a linear symmetrical position around the center in the flat condition in the left-right directions, on the upper edge portion of the left and right chambers 12c. Furthermore, the inflators 13 are inserted in the insertion parts 12e, and gas is separately supplied to the left and right chambers 12c from the inflators 13. Furthermore, tabs 12f are attached to both left and right sides of the respective inflators 13 on an upper edge of the airbag 12 in the flat condition, and the tabs 12f and stud bolts 13a are used to attach the airbag 12 to the vehicle seat 1 (refer to FIG. 1(a)).

Furthermore, in FIG. 2, a gas guide 18 essentially formed in a Y shape is provided in a storage part for the inflator 13. The gas guide 18 has an inlet 18a where the inflator 13 is inserted, a first outlet 18b that guides gas ejected from the inflator 13 into the side protecting chamber 12cb, and a second outlet 18c that guides the gas into the head protecting chamber 12ca. A cross-sectional area of the first outlet 18b and second outlet 18c are appropriately determined based on an amount of gas supplied to the side protecting chamber 12ca and head protecting chamber 12cb.

In the present invention, the airbag 12 is stored, for example, in a condition rolled into a roll shape or condition folded into a bellows shape from a first side portion of the backrest portion 1b of the seat 1 through an upper portion to a second side portion of the backrest 1b of the seat 1. Specifically, the pair of side protecting chambers 12cb configuring the airbag 12 are stored at opposing positions separated in the vehicle width direction on both left and right side portions of the backrest portion 1b of the seat 1, and the head protecting chambers 12ca are stored in an upper portion of the backrest portion 1b.

For example, at the time of a collision with the airbag device 11 of the present invention in a stored condition, the airbag 12 expands and deploys from a stored condition in FIG. 3(a) by gas ejected from the inflators 13, based on a signal from a sensor, as illustrated in FIGS. 3(b) and (c). Specifically, the head protecting chamber 12ca expands and deploys forward from the upper portion of the backrest portion 1b of the seat 1 by bursting past the headrest 1c, for example. On the other hand, the side protecting chambers 12cb expand and deploy forward from both left and right sides of the backrest portion 1b of the seat 1.

At this time, the side protecting chamber 12cb on a side where a seatbelt 3 passes expands and deploys between the seatbelt 3 and occupant 2. Furthermore, as illustrated in FIG. 4, a space S is formed between the occupant 2 and the airbag 12 expanded and deployed at a position where the seatbelt 3 passes by expansion and deployment of the side protecting chamber 12cb. Specifically, the space S is formed between an upper end portion of the shoulder 2c and side of the head on a side of the occupant 2 where the seatbelt 3 passes when seated at a normal position on the seat 1. With the seatbelt 3 passing over the top of a near side shoulder of the occupant, the side of the head of the occupant 2 is at a position corresponding to the upper end portion of the headrest 1c on the side door side. Furthermore, the upper end portion of the shoulder 2c of the occupant 2 is at a position corresponding to the upper end portion of the backrest portion 1b on the side door side.

In order to form the space S, the position where the seatbelt 3 of the airbag 12 passes in the flat condition is preferably positioned near an outlet for the gas ejected from the inflator 13 into the side protecting chamber 12cb during expansion and deployment as illustrated in FIG. 2.

Specifically, as illustrated in FIG. 2, if the side protecting chamber 12cb contains the shoulder and chest protecting part 12cba that covers the shoulder 2c and chest 2e of the occupant 2, and the waist protecting part 12cbb that covers the waist 2f of the occupant 2, the shoulder and chest protecting part 12cba is preferably formed at the position where the seatbelt 3 passes during expansion and deployment.

In order to form the shoulder and chest protecting part 12cba at the position where the seatbelt 3 passes during expansion and deployment, the tabs 12f on the center side in the left-right direction of the airbag 12 between both inflators 13 are attached to a portion of the seat 1 in the vicinity of the head 2a of the seated occupant 2, for example. On the other hand, the inflators 13 are attached to a portion of the seat 1 in the vicinity of the chest 2e of the seated occupant 2. Furthermore, the tabs 12f on both sides in the left-right direction of the airbag 12 of both inflators 13 are attached to a portion of the seat 1 in the vicinity of the waist 2f of the seated occupant 2 (refer to FIG. 1(a)).

As a result, in an initial stage of expansion and deployment of the airbag 12, high gas pressure is applied to a region of the airbag 12 sandwiched between the shoulder of the occupant 2 and the seatbelt 3 (duct portion connecting the head protecting chamber 12ca and the waist protecting part 12cbb of the side protecting chamber 12cb). Therefore, the airbag 12 can expand and deploy while pushing up on the seatbelt 3.

With this airbag 12, the space S is formed between the neck 2b of the occupant 2 and the seatbelt 3 (refer to FIG. 5) passing in the vicinity of line PL in the side surface view connecting the center of the head 2a and shoulder 2c of the occupant 2 during expansion and deployment.

In the present invention, relative movement of the expanded and deployed airbag 12 with regard to the occupant 2 is facilitated by the space S, and thus the shoulder 2c of the occupant 2 can be covered by the expanded and deployed airbag 12. Therefore, as illustrated in FIG. 3(c), even when the seatbelt 3 is tensioned, the expanded and deployed airbag 12 is in a condition sandwiched between the shoulder 2c of the occupant 2 and the seatbelt 3, and thus the seatbelt 3 can be suppressed from contacting the neck 2b of the occupant 2, thereby reducing injury to the neck 2b of the occupant 2.

At the same time, the seatbelt 3 is in a floating condition at least in the vicinity of an upper portion of the chest 2e of the occupant 2 due to the expanded and deployed airbag 12. On the other hand, a lower portion of the seatbelt 3 can appropriately restrain a lower portion of the occupant from the abdomen of the occupant 2, and thus the amount of chest deflection is reduced (refer to FIG. 1(a)).

In other words, according to the present invention, unnecessary forces applied to the occupant 2 can generally be minimized. Furthermore, forward movement of the occupant 2 during a frontal collision can be suppressed as compared to when restraining only with the seatbelt 3 and a front airbag 4, as illustrated in FIG. 6(a) (refer to FIG. 6(b)).

Furthermore, at an initial stage of a side collision, the occupant 2 tends to move toward the side of the collision due to inertial forces. At this time, in addition to a reactive force from a side portion of a vehicle body, a reactive force from the seatbelt 3 can be utilized along with the airbag 12 to restrain the occupant 2. Therefore, lateral movement of the occupant 2 can be suppressed as compared to when the seatbelt 3 is not present, as illustrated in FIG. 7(*a*) (refer to FIG. 7(*b*)). Furthermore, although not particularly illustrated in the drawings, when the head protecting chamber 12*ca* and side protecting chamber 12*cb* are provided in an integrally connected manner, the seatbelt 3 presses the expanded and deployed airbag 12 against the occupant 2 seated on a far side opposite from the collision side at the initial stage of the collision. Therefore, the entire airbag 12 where the head protecting chamber 12*ca* and side protecting chamber 12*cb* are integrally connected can be suppressed from moving to the far side. In other words, even when the occupant 2 moves in a width center direction of the vehicle, protecting performance against movement (collision) of the occupant 2 to the far side can be improved by the effect of restraining the airbag 12 by the seatbelt 3. This is the same even when forces acting on the occupant 2 on the near side and far side in a latter half of a collision are in opposite directions or during a rollover or the like. In other words, in the present invention, the performance of restraining and protecting the occupant 2 is expected to be improved in all side-direction collision events.

The airbag 12 is not limited to the first example described using FIGS. 1 to 7 and may be configured as described in the second to fourth examples illustrated in FIGS. 8 and 9.

FIG. 8 illustrates the second example of the airbag 12. In the second example, an expanded portion of the shoulder and chest protecting part 12*cba* and head protecting chamber 12*ca* of the chamber 12*c* where the seatbelt 3 passes extends further downward than an expanded portion of another chamber, for example, in the flat condition prior to being rolled into a roll shape or folded into a bellows shape (refer to FIG. 8(*a*)). In this case, as illustrated in FIG. 8(*b*), when the airbag 12 is expanded and deployed, an extending part 12*d* of the head protecting chamber 12*ca* and shoulder and chest protecting part 12*cba* wraps around in front of the occupant 2 by contacting the seatbelt 3.

Furthermore, FIG. 9 illustrates the third example of the airbag 12. In the third example, an extending portion 12*cc* extending further downward than the extending part 12*d* is formed only on the shoulder and chest protecting part 12*cba* of the side protecting chamber 12*cb* where the seatbelt 3 passes, for example, in the flat condition prior to being rolled in a roll shape and folded into a bellows shape (refer to FIG. 9(*a*)). In this case, as illustrated in FIG. 9(*b*), the range where the airbag 12 wraps around in front of the occupant 2 due to contact with the seatbelt 3 is further increased, and the restraining performance of the occupant 2 is further improved.

Furthermore, FIG. 10 illustrates the fourth example of the airbag 12. In the fourth example, an extending part 12*cd* extending further downward is also formed in the head protecting chamber 12*ca*, in addition to the shoulder and chest protecting part 12*cba* illustrated in FIG. 9, for example, in the flat condition prior to being rolled in a roll shape and folded into a bellows shape (refer to FIG. 10(*a*)). In this case, as illustrated in FIG. 10(*b*), the front of the head 2*a* of the occupant 2 can be covered by the airbag 12, and therefore, restraining performance of the occupant is further improved.

Needless to say, while the present invention is not limited to the abovementioned examples, the embodiments may be appropriately changed within the scope of the technical concepts described in each claim.

In other words, the airbag device described above is a preferred example of the present invention, and embodiments other than those described can also be implemented or executed via a variety of methods. Unless particularly limited in the specification of the present application, the shape, size, and configuration, arrangement, and the like of the parts illustrated in the attached drawings in the present invention are not restricted. Moreover, the expressions and terms used in the specification of the present application are for the purpose of description and not limited thereto unless specifically limited.

For example, in the airbag 12 illustrated in FIG. 8(*a*), the shoulder and chest protecting part 12*cba* and head protecting chamber 12*ca* on the side where the seatbelt 3 passes extends downward, in a flat condition prior to being rolled in a roll shape or folded into a bellows shape. However, only the shoulder and chest protecting part 12*cba* may extend downward.

Furthermore, as illustrated in FIG. 2 and FIGS. 8 to 10, the side portion of the occupant 2 covered by the airbag 12 is not limited to covering the head 2*a* to waist 2*f* of the occupant 2, and a line PL portion in the side surface view connecting a center of the head 2*a* and center of the shoulder 2*c* of the occupant 2 can be protected. For example, only the head 2*a*, neck 2*b*, shoulder 2*c*, and upper arm 2*d* of the occupant 2 may be covered as illustrated in FIG. 11(*a*), or the chest 2*e* may be covered in addition to the head 2*a*, neck 2*b*, shoulder 2*c*, and upper arm 2*d* of the occupant 2, as illustrated in FIG. 11(*b*). Furthermore, as illustrated in FIG. 11(*c*), forming the space S between the neck 2*b* of the occupant 2 and the airbag 12 at the position where the seatbelt 3 passes when only the head 2*a* and neck 2*b* of the occupant 2 are covered reduces the effect as compared to those illustrated in FIGS. 11(*a*) and (*b*). However, restraining performance of the occupant 2 is improved as compared to a conventional case. Furthermore, as illustrated in FIG. 11(*d*), a non-expanding portion (hatched portion) may be formed at a position where the seatbelt 3 passes. In this case, the thickness of the airbag 12*b* around an arm (and particularly the upper arm 2*d*) of the occupant 2 can be reduced, and therefore, the rate of expansion and deployment of the side protecting chamber 12*cb* can be increased regardless of the inclination of the occupant 2.

Furthermore, the airbag 12 is not limited to an airbag formed by stitching two sheets, and may be an airbag formed using a so-called "one-piece weaving" technique.

Furthermore, the airbags 12 illustrated in FIG. 2 and FIGS. 8 to 10 are provided with the gas guide 18. However, the gas guide 18 may be omitted so long as the gas from the inflator 13 is reliably guided to the side protecting chamber 12*cb* and head protecting chamber 12*ca*.

Furthermore, the aforementioned description describes the airbag device 11 applied to the seatbelt 3 installed on the near side. However, the airbag device 11 of the present invention can be applied to the seatbelt 3 installed on the far side. Naturally, a seatbelt installed on both the near side and far side can be applied. Furthermore, the seatbelt 3 where the airbag device 11 of the present invention can be applied is not limited to seatbelts secured in a lateral vicinity of the vehicle seat 1, but may be seatbelts secured to a rear of the vehicle seat, as with a sports car.

Furthermore, in the first to fourth examples, the inflator 13 is provided on the upper edge portion of the airbag 12 in the flat condition prior to being rolled into a roll shape or folded into a bellows shape. However, the inflators 13 may be provided on both left and right sides of the airbag 12 in the flat condition.

REFERENCE NUMERALS

1: Vehicle seat
1b: Backrest portion
1c: Headrest
2: Occupant
2a: Head
2b: Neck
3: Seatbelt
11: Airbag device
12: Airbag
12c: Chamber
12ca: Head protecting chamber
12ca: Side protecting chamber
12cba: Shoulder and chest protecting part
12cbb: Waist protecting part
12cc: Extending part
12cd: Extending part
12d: Extending part
12f: Tab
13: Inflator
13a: Stud bolt
S: Space

The invention claimed is:

1. An airbag device for a seat of a vehicle, the airbag device comprising:
an airbag for storage within the seat and deployment from the seat to integrally cover a head and a side portion of an occupant seated on the seat; and
an inflator for supplying gas to the airbag;
wherein the airbag defines a plurality of chambers including a head protecting chamber for storage in an upper portion of a backrest portion of the seat and configured to extend over a head of the occupant and first and second side protecting chambers for storage in left and right side portions, respectively of the backrest portion and configured to cover a side portion of the occupant, and
wherein the airbag has a rear side, a forward side and first and second lateral sides, the forward side including a central portion parallel to the rear side, a first lateral portion rearwardly angled from the central portion to the first lateral side, and a second lateral portion rearwardly angled from the central portion to the second lateral side, the head protecting chamber extending between the rear side and the central portion of the forward side and configured to forwardly extend at least as far as the first and second side protecting chambers.

2. The airbag device according to claim 1, wherein a space is formed between an upper end portion of a shoulder and side of the head of the occupant seated at a regular position of the seat.

3. The airbag device according to claim 1, wherein a position of the airbag where a seatbelt of the seat passes proximate to an outlet of gas ejected from the inflator into one of the first and second side protecting chambers during expansion and deployment.

4. The airbag device according to claim 1, wherein each side protecting chamber has a shoulder and chest protecting part configured to cover a shoulder and a chest of the occupant, and a waist protecting part configured to cover a waist of the occupant, and the shoulder and chest protecting part is formed at a position where a seatbelt of the seat passes during expansion and deployment.

5. The airbag device according to claim 1, wherein each side protecting chamber has a shoulder and chest protecting part configured to cover a shoulder and a chest of the occupant, and a waist protecting part that covers a waist of the occupant.

6. The airbag device according to claim 4, wherein the shoulder and chest protecting part of one of the first and second side protecting chambers has an extending part that extends further below the airbag than another portion of the one of the first and second side protecting chambers in a flat condition.

7. The airbag device according to claim 5, wherein the shoulder and chest protecting part of one of the first and second side protecting chambers has an extending part that extends further below the airbag than another portion of the one of the first and second side protecting chambers in a flat condition.

8. The airbag device according to claim 1 in combination with the seat, wherein:
attachment of the airbag to the backrest portion is performed by stud bolts provided on the inflator.

9. The airbag device according to claim 3, wherein:
attachment of the airbag to the backrest portion is performed by stud bolts provided on the inflator.

10. The airbag device according to claim 1, wherein each side protection chamber includes a shoulder and chest protection part and a waist protecting part, the shoulder and chest protection part of the first side protection chamber extending between the rear side and the forward side at a first intersection of the central portion and first lateral portion of the forward side and the shoulder and chest protection part of the second side protection chamber extending between the rear side and the forward side at a second intersection of the central portion and second lateral portion of the forward side.

11. The airbag device according to claim 1, wherein the central portion of the forward side of the airbag is offset laterally offset, such that a portion of the first side protecting chamber is configured to forwardly extend farther than the second side protecting chamber.

12. The airbag device according to claim 1, wherein the airbag further includes an extending part between the central portion of the forward side and the first lateral side, the extending part configured to extend forwardly farther than the central portion.

13. The airbag device according to claim 1, wherein the airbag device has a distance between the rear side and the forward side that linearly decreases from the central portion to the first lateral side and from the central portion to the second lateral side.

14. The airbag device according to claim 1, further comprising:
a first gas guide including a first inlet, a first outlet and a second outlet, the first outlet for guiding gas from the inflator to the first side protecting chamber and the second outlet for guiding gas from the inflator to the head protecting chamber; and
a second gas guide including a second inlet, a third outlet and a fourth outlet, the third outlet for guiding gas from a further inflator to the second side protecting chamber and the fourth outlet for guiding gas from the further inflator to the head protecting chamber.

15. The airbag device according to claim 1, wherein the head protecting chamber includes a first portion fluidly separated from a second portion about a lateral center line.

16. An airbag device for a seat of a vehicle, the airbag device comprising:

an airbag for storage within the seat and deployment from the seat to integrally cover a head and a side portion of an occupant seated on the seat;
a first inflator; and
a second inflator
wherein the airbag has a rear side, a forward side and first and second lateral sides, the forward side including a central portion, a first lateral portion rearwardly extending from the central portion to the first lateral side, and a second lateral portion rearwardly extending from the central portion to the second lateral side, and
wherein the first and second lateral sides are fluidly separated from each other, the first lateral side inflatable with gas from the first inflator and the second lateral side inflatable with gas from the second inflator, the first and second lateral sides both defining a portion of a head protecting chamber for storage in an upper portion of a backrest portion of the seat and configured to extend over a head of the occupant, the first and second lateral sides defining first and second side protecting chambers for storage for storage in left and right side portions, respectively, of the backrest portion and each configured to cover a side portion of the occupant, the head protecting chamber extending between the rear side and the central portion of the forward side and configured to forwardly extend at least as far as the first and second side protecting chambers.

17. The airbag device according to claim 16, wherein the central portion of the forward side of the airbag is offset laterally offset, such that a portion of the first side protecting chamber is configured to forwardly extend farther than the second side protecting chamber.

18. The airbag device according to claim 16, wherein the airbag further includes an extending part between the central portion of the forward side and the first lateral side, the extending part configured to extend forwardly farther than the central portion.

19. The airbag device according to claim 16, wherein the airbag device has a distance between the rear side and the forward side that linearly decreases from the central portion to the first lateral side and from the central portion to the second lateral side.

* * * * *